US012761838B2

(12) United States Patent
Jaworski

(10) Patent No.: US 12,761,838 B2
(45) Date of Patent: Oct. 13, 2026

(54) MANDATORY COMPLIANCE DOCUMENT MANAGEMENT AND SUBMISSION SYSTEM AND METHOD

(71) Applicant: KYOCERA DOCUMENT SOLUTIONS, INC., Osaka (JP)

(72) Inventor: Travis M. Jaworski, Seattle, WA (US)

(73) Assignee: Kyocera Document Solutions Inc., Osaka (JP)

( * ) Notice: Subject to any disclaimer, the term of this patent is extended or adjusted under 35 U.S.C. 154(b) by 294 days.

(21) Appl. No.: 18/678,714

(22) Filed: May 30, 2024

(65) Prior Publication Data

US 2025/0370663 A1 Dec. 4, 2025

(51) Int. Cl.

| | |
|---|---|
| ***G06F 3/12*** | (2006.01) |
| ***G06F 40/123*** | (2020.01) |
| ***G06F 40/166*** | (2020.01) |
| ***G06F 40/197*** | (2020.01) |
| *G06F 40/10* | (2020.01) |
| *G06F 40/103* | (2020.01) |

(52) U.S. Cl.

CPC .......... *G06F 3/1203* (2013.01); *G06F 3/1263* (2013.01); *G06F 3/1285* (2013.01); *G06F 40/123* (2020.01); *G06F 40/166* (2020.01); *G06F 40/197* (2020.01); *G06F 40/10* (2020.01); *G06F 40/103* (2020.01)

(58) Field of Classification Search

None

See application file for complete search history.

(56) References Cited

U.S. PATENT DOCUMENTS

| | | | | |
|---|---|---|---|---|
| 11,652,929 | B2 * | 5/2023 | Inouye | G06F 3/1204 358/1.15 |
| 2008/0151288 | A1 * | 6/2008 | Matsunoshita | H04N 1/32144 358/1.15 |
| 2011/0131175 | A1 * | 6/2011 | Kawai | G06F 40/103 707/E17.008 |
| 2018/0032286 | A1 * | 2/2018 | Panda | G06F 3/1288 |
| 2019/0087142 | A1 * | 3/2019 | Pinney | G06F 3/1248 |

* cited by examiner

*Primary Examiner* — Haris Sabah

(74) *Attorney, Agent, or Firm* — Millen, White, Zelano & Branigan P.C.; William F. Nixon

(57) ABSTRACT

A system for managing mandatory compliance documents is disclosed. The system functions as a platform for supporting users to manage and submit documents online. An initiating user generates an executable document and sends this document together with rules in a link to a number of receiving users. The rules allow the receiving parties to e-sign the document and save the signed document in their respective user profiles. In particular, the receiving users may select remotely a printing device located in the initiating user's location so that a print job will be sent to the printing device directly from the receiving users. A method for managing mandatory compliance document is also disclosed.

20 Claims, 6 Drawing Sheets

MANDATORY COMPLIANCE DOCUMENT MANAGEMENT AND SUBMISSION SYSTEM AND METHOD

FIELD OF THE INVENTION

The present invention relates to a system and a method for managing and submitting mandatory compliance documents electronically. More particularly, the present invention relates to a system and a method for executing the mandatory compliance documents and remotely selecting a printing device on a mobile device.

DESCRIPTION OF THE RELATED ART

In both U.S. public and private school systems for K through 12th grades, mandatory compliance documents are required for students to both attend school and to go on field trips outside of school grounds. The most common examples of such documents are forms showing proof of vaccination (students are usually required minimum vaccinations to attend, even in higher education) and permission slips to attend field trips. Most schools need to readily have these documents on hand, especially before field trips take place. Problems can arise when the parents forgot to sign and submit the documents, such as permission slips, or the students forget to submit such documents as students are not always the most reliable of letter carriers.

Therefore, a mandatory compliance management and submission platform to alleviate the difficulties of submitting paperwork via student carrier is desired.

SUMMARY OF THE INVENTION

A computer-implemented method for managing executions of mandatory compliance documents is disclosed. The method comprises accessing a database storing a plurality of documents to retrieve a document, assigning a policy to the document retrieved from the database, wherein the policy includes at least one of priority levels, deadlines, distributed printing devices, and recipients of the document, sending the document from a first location, via a wireless network, to at least one remote computing device after the policy is assigned, executing the document at the at least one remote computing device, sending the executed document from the at least one remote computing device to the first location, receiving the executed document from the at least one remote computing device, and post-processing the document received from the at least one receiving computing device according to the policy assigned to the document.

The post-processing includes directing the executed document received from the at least one remote computing device to a printing device for printing, saving the executed document received from the at least one receiving computing device to a specific file in the database, wherein the specific file is associated with the at least one remote computing device.

The computer-implemented method further comprises selecting, at the at least one remote computing device, a printing device located within the first location for printing the executed documents, after executed by the at least one remote computing device and before sending the executed document to the first location. The document is sent to and processed by multiple computing devices located within the first location. The post-processing includes sending all documents received from the multiple computing devices to a print job queue in an order according to rules stored in the database, and directing the documents to at least one printing device for printing.

Another computer-implemented method for managing executions of mandatory compliance documents is further disclosed. The method comprises, at a local location, generating at least one document and assigning policies to the at least one document, wherein the policies include priority levels, deadline for executing the plurality of documents, designated printing devices, and categories of recipients of the at least one document, storing the at least one document in at least one file in a database, sending a link to at least one remote computing device, wherein the link allows the at least one remote computing device to access the at least one document stored in the at least one file, and wherein the at least one file is associated with the at least one remote computing device, respectively, accessing and executing the at least one document by the at least one computing device, and acknowledging that the at least one document has been executed.

The executed document is saved to one of the at least one file associated with the at least one remote computing device. The at least one remote computing device selects a printing device among the designating printing devices by the at least one remote computing device to print out the executed documents. Further, the executed document is directly sent to the selected printing device from the at least one remote computing device.

The computer-implemented method further comprises receiving the executed documents at the local location, selecting a printing device from the designating printing device at the local location, and sending the executed document to the selected printing device for printing.

Further, all saved documents are sent to a print job queue in an order according to rules stored in the database, and directing the documents to printing devices selected at the local location.

A system for managing executions of mandatory compliance documents is further disclosed. The system comprises a database storing a plurality of documents, and a managing device accessible to the plurality of documents stored in the database, comprising a processor, wherein the database further stores medium-readable instructions, which when executed, causes the processor to access the database to retrieve a document from the plurality of documents, assign a policy to the document, wherein the policy includes at least one of priority levels, deadlines, distributed printing devices, and recipients of the document, deliver the document to at least one receiving computing device after the policy is assigned, receive the document from the at least one receiving computing device after the document is processed by the receiving computing device, and post-processing the document received from the at least one receiving computing device according to the policy assigned to the document.

The post-processing includes directing the executed document received from the at least one remote computing device to a printing device for printing and saving the executed document received from the at least one receiving computing device to a specific file in the database, wherein the specific file is associated with the at least one remote computing device.

The at least one remote computing device selects a printing device located within the first location, and sends the document, after executed, directly to the selected printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
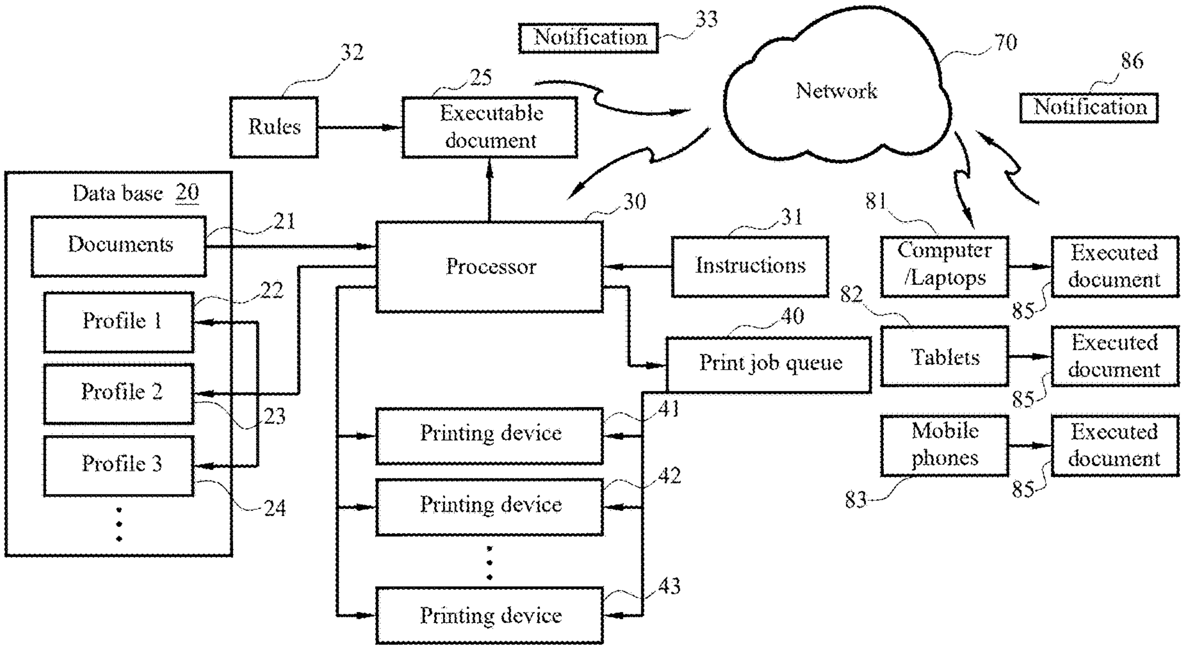
FIG. 1 illustrates a block diagram of a system for managing mandatory compliance documents in accordance with the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Systems and methods for managing mandatory compliance documents in accordance with the present invention are disclosed. The systems can be used at organizations and companies, such as schools and mortgage companies, to mange their mandatory compliance documents. A challenge for executing mandatory compliance documents is to get the documents executed properly and submitted on time. Examples of mandatory compliance documents used in the schools may include surveys, registration forms, vaccination forms, permission forms for field trips, sports and activities outside of the schools, etc. Examples of mandatory compliance documents required for companies may include application forms, power of attorney forms, etc. Take the example of public schools, normally the students from grades K-12 are required to submit permission forms signed by their parents or guardians before going on activities outside of the schools. Conventionally, the students take home hard copies of permission forms to have them signed by their parents or guardians. Such a manner has deficiencies as the students sometimes forget to bring back the forms or the parents/guardians forget to sign the forms.

An on-line system and method for managing mandatory compliance documents, therefore, become convenient for people who are involved in handling the compliance mandatory documents. In accordance with the preferred embodiments, a mandatory compliance management and submission platform is provided to alleviate the difficulties of submitting paperwork by students. The system and method provide many ways for submitting the documents through a network. For example, an initiating party, such as a teacher or an administrator of the school, may generate a mandatory compliance form and set rules or selectable options for executing the form, and send such a generated mandatory compliance form to a receiving party, such as a parent of a student. The receiving party has options of printing out the form, signing the printed form, and submitting the signed form physically, or electronically signing the form and submitting the form online. In addition, the receiving party has an option to send the signed form to a printer located in the proximity of the initiating party, and/or save the signed form to a database designated to the student. The database is accessible by the school or is associated with the school.

The mandatory compliance management and submission platform may be configured as an application for administrators of the schools to use to manage their mandatory compliance documents. This application can also be linked to multiple function printers (MFPs) of the schools to easily facilitate printing of these documents. From a general user standpoint, the administrator would then invite parents via email or QR code to download the application. From this application, the parents would be able to do many mandatory compliance related actions including:

1) Sign documents uploaded to the application by the school via signing app, such as docusign or other 3rd party signing app.
2) Upload pre-signed and scanned documents via google drive or other 3rd party doc storage app.
3) Use a mobile device camera in the application to take a photo of a signed document.
4) Be able to use the application to manage all their mandatory compliance documents across multiple categories (field trips, vaccinations, permission slips, etc.) potentially for multiple students, at multiple schools.

More particularly, the mandatory compliance management and submission system or platform allows the parents to select how they would like to submit the signed documents. For example, the parents or guardians are able to select remotely printing the documents at a printer located at the school and send notifications to the administrator for the submission. The parents or guardians may use mobile photos and manage documents online. The parents or guardians may also be able to manage and control how many documents to be uploaded to the system. The parents or guardians may save the signed documents in respective folders of a database of the school associated with their children. The parents may also send the signed form back in an email or in any appropriate social media method to the school. That is, the disclosed embodiments not only provide the flexibility for the parents or the receiving party to execute the mandatory compliance documents, but also provide a variety of ways to submit the executed forms.

FIG. 1 illustrates a block diagram of a system 100 for managing documents, such as mandatory compliance documents, in accordance with the disclosed embodiments. As described above, system 100 may be used in schools, companies, or organization. For the purpose of illustrations, the followings will describe a document managing system used in schools as an example.

System 100 includes a database 20 that stores documents 21 related to every student attending the school. The documents may be sorted by students, grades, vaccination, field trip, etc., and may include different categories including vaccination forms, permission forms, registration forms, application documents, and so on. Database 20 may be administrated and accessible by an administrator of the school.

Database 20 stores a number of student profiles 22, 23, 24, each of which corresponds to a respective student. Each respective profile 22-24 stores a student's grade, vaccination records, family information, physical forms and so on. Based on the policies of different schools, the parents or guardians may access their children's profiles and execute documents online. Student profiles 22, 23, and 24 may also be formed as a link to be sent to the student's parents or guardians. According to the disclosed embodiments, whenever a mandatory compliance document is needed for the parents' or guardians' attentions, administrators or teachers will generate an executable document 25 that can be a form or a document by means of processor 30 and send the executable document 25 to the parents or guardians through emails or texts. Document 21 may be a template form or document saved in database 20 that is editable by the administrators or teachers to add additional information, such as titles, deadlines, locations, levels of urgency, costs, options of selectable printers, and so on. After generated, executable document 21 may be saved in the students' respective profiles before being sent to the parents or guardians or be sent out to the parents or guardian directly without being saved in the files.

Processor 30 edits and/or generates executable document 25 based on instructions 31 received from the administrator. Processor 30 may also add rules 32 corresponding to instructions 31 to executable document 25, designates one or more printers among a plurality of printing devices 41, 42, . . . , 43 that can be chosen by the parents or guardians for printing the executable document 25 after executed, generate a link for accessing the executable document 25, import the executable document 25 to respective student profiles 22-24, and transmit a notification 33 to the parents or guardians via network 70. The notification includes emails or texts to notify the parents or guardians that a pending document is created for their attention. Processor 30 may further generate a print job queue 40 and managing printing jobs based on polices and rules assigned to the printing devices 41-43. In accordance with the preferred embodiments, executable document 25 may be saved in the student's profiles, and a link directing to the students' profiles will be sent to computing devices 81-83 associated with the parents or guardians. Alternatively, executable document 25 may be sent directly to the computing devices via emails or texts.

Computing devices 81-83 include computers 81, tablets 82, and mobile devices 83, such as mobile phones. For first-time users, the parents or guardians may receive an invitation link or a OR code for them to register into system 100. Once the parents or guardians register and create an account, they will be able to connect to a portal school website operated by system 100 to review their children's profiles anytime or upon receiving notification 33. If there is a pending document to be signed, a parent or guardian can retrieve the pending document and sign the document with an electronic signing app, such as Docsign app, or a third party signing app. The signed document, e.g., executed document 85, is then submitted to the portal school website and system 100. In addition, a notification 86 to inform the submission of executed document 85 may also be sent to system. 100 to be delivered to the school administrators or teachers. Details of submitting the executed document 85 will be described below.

One significant feature of the disclosed embodiments is that the parent or guardian can sign the executable document 25 on-line, and also can instruct the signed document (that is, executed document 85) to be printed out at a printing device located in the school. The parent or guardian may also choose to take a photo of the signed document 85 using a camera of their mobile devices and to submit the photo to the school website, or upload the signed document from a Google Drive or other storage location.

Printing devices 41-43 are multi-functional printing devices and are located in the school site. When generating executable document 25, processor 30 designates which printing devices are selectable by the parents or guardians. The designation of the printing devices may be based on the locations of the printing devices that are closer to the user who sends out the executable document or are convenient for the user's reach, the capabilities of the printing devices to print out documents in color, in specific paper size or thickness, and so on. All the print jobs sent by the parents or guardians will be stored in a print job queue 40 and will be processed in an order of first-in first-out manner. The print jobs may also be printed out in an order of their emergency levels and deadlines. Managing the print jobs will be controlled by processor 30 and will be described more later.

Rules 32 added by processor 33 to executable document 25 are generated in accordance with instructions 31 received from the school administrators or teachers. Rules 32 decide how the parents or guardians may execute executable document 25 and submit executed document 85.

Figure 2:
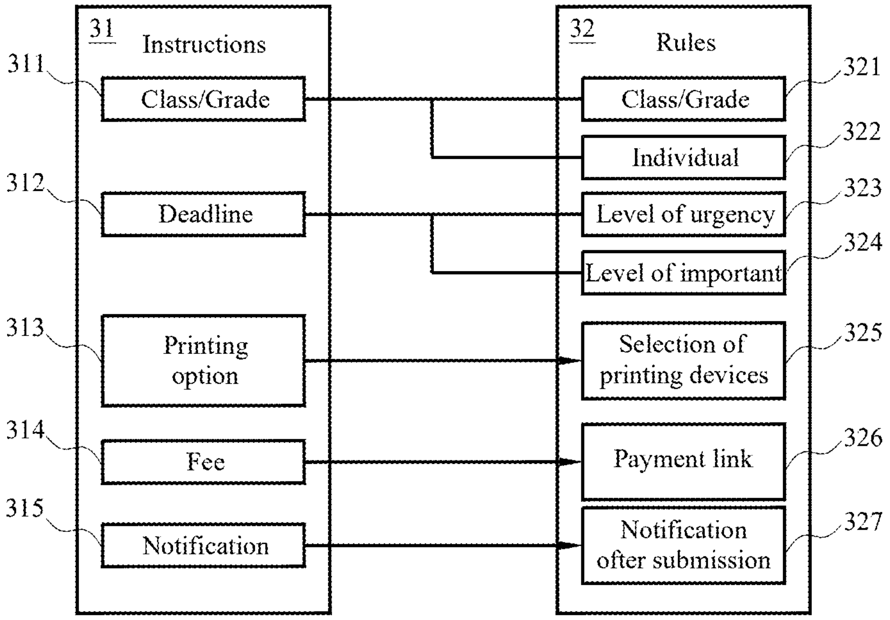
FIG. 2 is a chart listing instructions information and their corresponding rule information.

FIG. 2 is a chart listing instructions information and their corresponding rule information. Instructions 31 are information entered by the school administrators or teachers. Instructions 31 could be entered through a user interface, such as a computer screen. When generating executable document 25, the school administrators or teachers select a template document from documents 21 and edits the template document to enter information such as, but not limited to, students' grades and class numbers 311, deadline 312 for executing the executable document 25, printing options 313, cost 314 if there is any, and notification manner 315. The school administrators or teachers could choose to send out the executable document 25 to a group of recipients or an individual. The user could also select desired printing devices among printing devices 41-43 to print out executed document 85 submitted by the parents or guardians.

Upon receipt of instructions 31, processor 30 analyzes them and composes and activates rules 32 to be attached with executable document 25. As described earlier, the executable document 25 together with rules 32 could be saved in the student's profiles and be sent out in a link to the parents or guardians via texts or emails. Rules 32 are created based on instructions. For example, based on grade/class instruction 311, rules 321 and 322 indicate that the executable document 25 may be sent out to a group of recipients (rule 321) or to an individual (rule 322). According to the deadline instructions 312, processor 30 may rank an urgency level rule 323 for the executable document 25. For example, an executable document with a deadline within one day will be marked as higher urgency level than another executable document with a deadline within 1 week. Processor 30 can further generate an importance level rule 324 for the executable document. For example, if an executable document is related to a scholarship application, it may be marked with a higher importance level than a sport uniform purchase document. Therefore, when a number of executed documents 85 are received by system 100 and sent to print job queue 40, processor 30 will judge the urgency levels and the importance levels of the number of executed documents 85 to adjust a printing order of those received executed documents 85.

Rule 325 corresponds to the instruction of printing options 313 that provide a choice ability for the parents or guardians to select which printing devices to print out the executable document 85. When there is a fee to submit with executable document 25, rule 326 provides a payment link for the parent or guardians to send in the payment. If the user prefers a notification after executed document 85 is submitted (instruction 315), rule 327 indicates that a notification 86 will be sent out to system 100 after executed document 85 is submitted.

Items of instructions 31 and rules 32 may be customable by system 100 and are not limited to those shown in FIG. 2.

Figure 3:
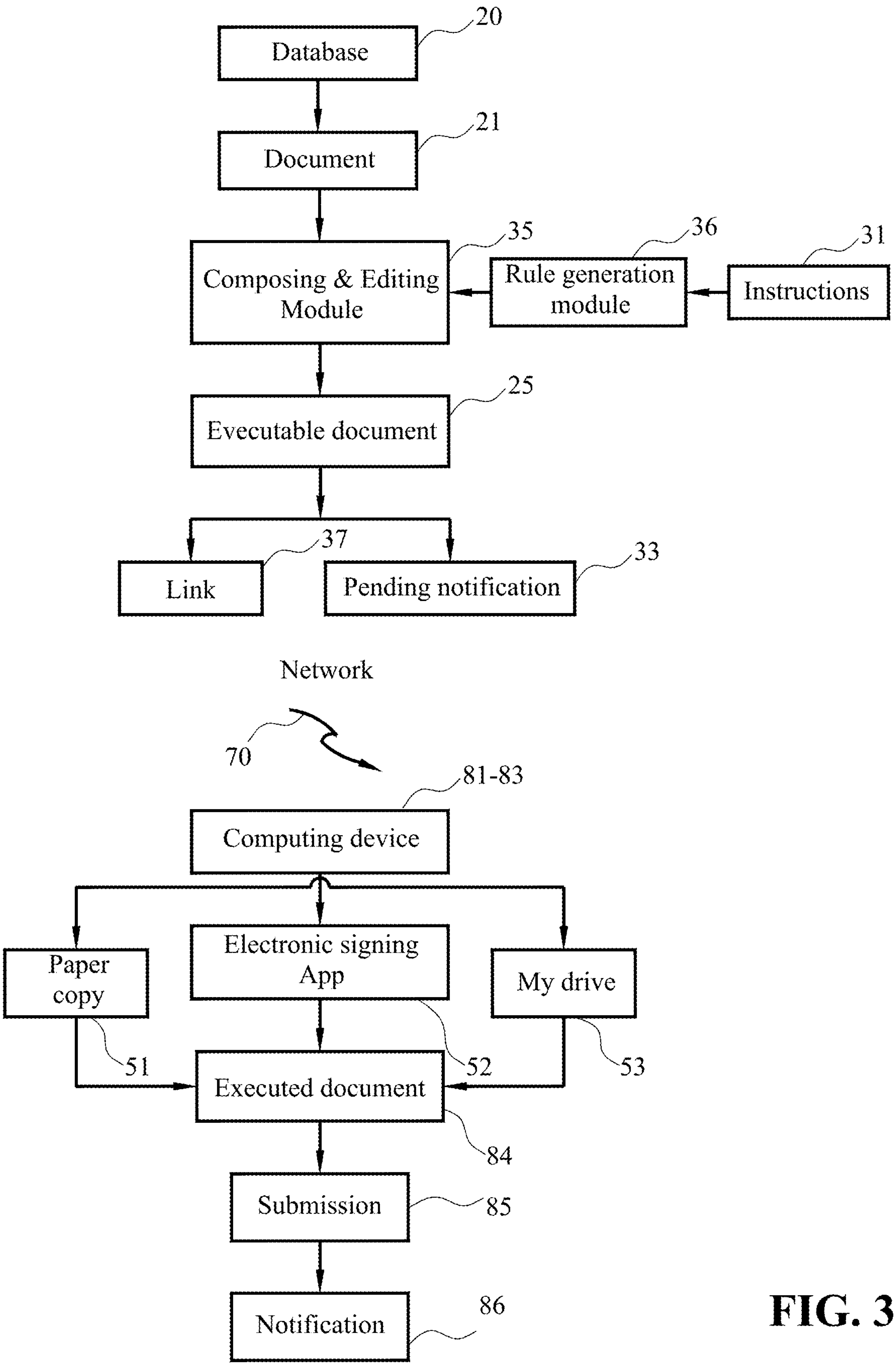
FIG. 3 is a block diagram of system for managing mandatory compliance documents in more details in accordance with the disclosed embodiments.

FIG. 3 is a block diagram of system 100 for managing mandatory compliance documents in more details in accordance with the disclosed embodiments. In FIG. 3, composing and editing module 35 and rule generation module 36 are used to compose executable document 25. Composing and editing module 35 and rule generation module 36 may be part of processor 30. For simplification, elements that have been described in FIG. 1 will bear the same element numbers.

When a mandatory compliance document is needed to be executed by the parents or guardians, the school administrators or teachers may first retrieve template document 21 from database 20. The school administrator then will fill out information to document 21, such as a title of the document and descriptions of the purpose of the document. Next, the school administrators or teachers define what needs to be done for the document by entering instructions 31 as those specified in FIG. 2.

Rule generation module 36 generates rules corresponding the instructions 31 received from the user. Examples of rules are shown in FIG. 2. For example, the rules include whether document 21 is addressed to an individual student or a group of students, whether there is a payment required, or whether the parents or guardians can select a printing device in the user's proximity, and so on.

Composing and editing module 35, after receiving the rules generated by rule generation module 36, composes an executable document 25 with embedded rules. Composing and editing module 35 may also generate a link 37 for accessing the executable document 25 to be sent to the parents or guardians through network 70. Alternatively, composing and editing module 35 sends out a pending notification (such as notification 33 of FIG. 1) to the parents or guardians through network 70.

The above-mentioned link 37 and notification 33 are sent to computing devices (such as computing devices 81-82 of FIG. 1) of the parents or guardians. If a signature on the executable document 25 is required, an electronic or online signing app 50, such as DocuSign app or a third-party signing app, can be used by computing devices 81-83 to preform e-signature and embedded the rules. Some parents or guardians prefer to sign on a paper copy. In this case, the parents or guardians may print out the document 25 and sign on a paper copy 25 of executable document 25. The parents or guardians may also upload a previously signed document via Google Drive or their mobile device storage 53. In any manner, an executed document 85 is generated and submitted to system 100, and notification 86 is sent out to the system 100 to be delivered to the user.

Figure 4:
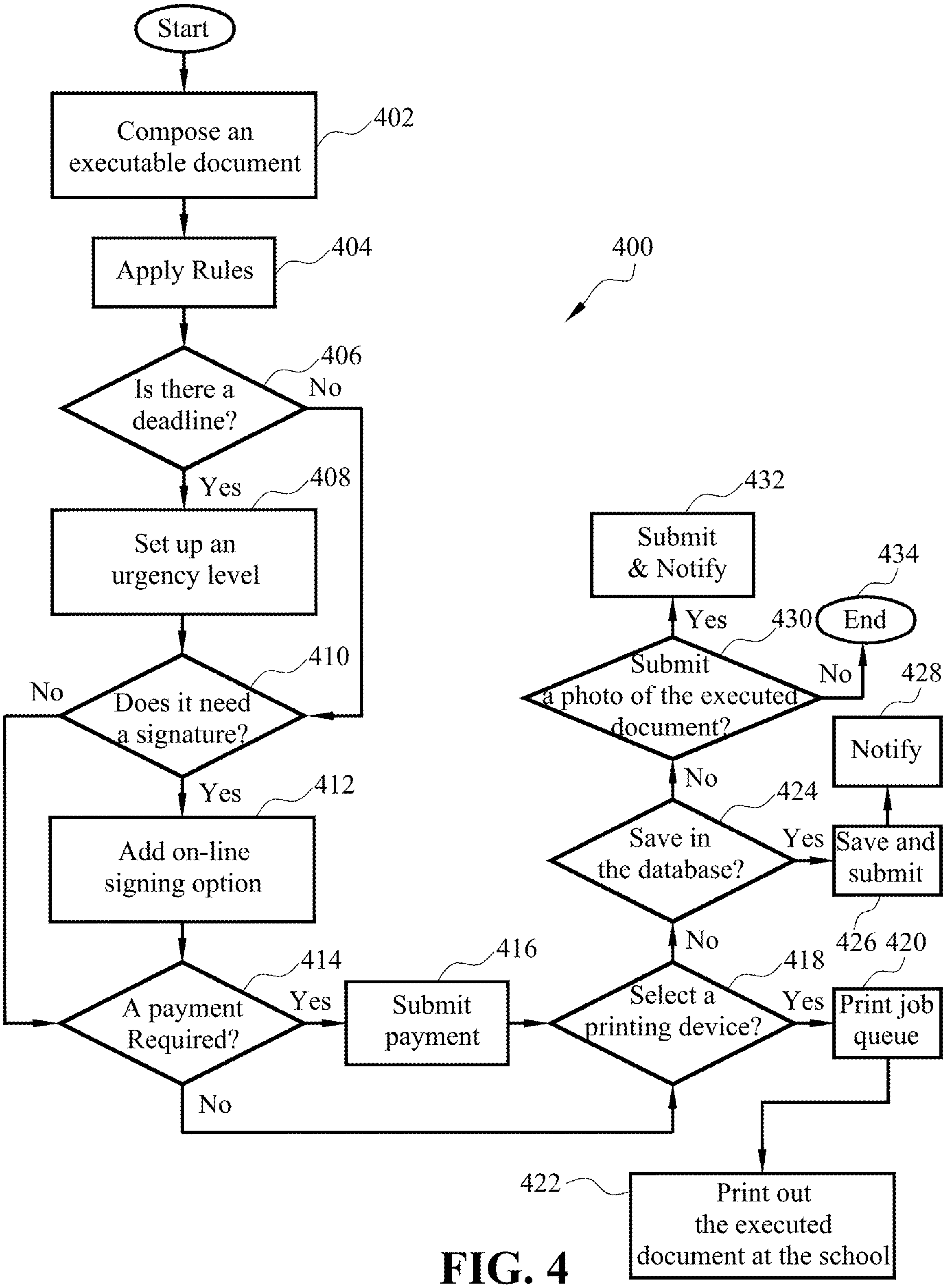
FIG. 4 is a flow chart of a method for managing mandatory compliance document in accordance with the disclosed embodiments.

FIG. 4 is a flow chart 400 of a method for managing mandatory compliance document by the parents or guardians in accordance with the disclosed embodiments. Flow chart 400 starts with composing an executable document at step 402.

At step 402, when the parents or guardians are required to sign documents, such as a permission slip for a field trip, a school administrator or a teacher will compose a permission slip based on a template document retrieved from database 20 to be an executable document. During step 402, the school administrator or teacher inputs information such as title of the permission slip and descriptions of the field trip. The school administrator or teacher further enter instructions on how to deliver the permission slip, how to receive the permission slip after executed by the parents or guardians, what printing devices located in the school are selectable by the parents or guardians to print out the executed permission slip, and so on.

Step 404 executes by applying rules generated based on the instructions received from the school administrator or teacher at step 402. The corresponding relations between the rules and the instructions has been described in FIG. 2.

Step 406 executes by determining if there is a deadline for returning the permission slip from the instructions received from the school administrator or teacher. If the answer is No ("N"), the process goes to step 410.

Step 408 executes by setting up an urgency level for the permission slip, when the answer of step 406 is Yes ("Y"). The urgency level may be based on the deadline of returning the permission slip or an importance level thereof.

Step 410 executes by determining if the parents or guardians need to sign the permission slip. If the answer is No, then the process goes to step 414. Otherwise, the process goes to step 412.

Step 414 executes by determining if a payment is required. When there is no payment required, the process continues at step 418.

When a payment is needed, step 416 executes by connecting a payment site or link for the parents or guardians to make the payment.

Next, step 418 executes if a printing device remotely located at the school site is selected by the parents or guardians. In accordance with the disclosed embodiments, the parents or guardians can not only select a printing device near them, but can also select motely a printing device which is located in the school site, not in the proximity of the parents or guardians. This function provides more flexibility for the parents or guardians to submit the permission slip after signing it. This feature is important as it negates lost documents, and helps to relieve stress from forgotten documents. If the student is already at school without bring in the permission slip, the parents or guardians could be contacted by the school and they can easily upload needed documents from home or work. This way the students without the correct documentation would not miss out on educational opportunities due to avoidable oversights on the parts of parents or school administrators/teachers.

If a remote printing device is selected, steps 420 executes by sending the executed permission slip to a print job queue, such as print job queue 40 of FIG. 1. Next, step 422 executes by printing out the executed permission slip at the school.

Processor 30 controls the order of prints jobs sent to the print job queue. If one print job has a higher urgency level, processor 30 may move this print job to the front of the print job queue so that it can be printed out earlier. Processor 30 can also re-route the print job to another printing device in the school when the selected printing device has too may print jobs in queue, or has issues, such as running out of papers and toner, having paper jammed, etc. The management of processing the print job will be described below in FIG. 6.

Continue with FIG. 4, step 424 executes by determining if the parents or guardians do not select a remote printing device, but instead choose to save the executed permission slip in their students' profiles.

If the answer is Yes, step 426 executes by saving the executed permission slip and step 428 executes by sending a notification via an email or a text to the school administrator or teacher.

If the answer is No, step 430 executes by determining whether the parents or guardians choose to submit a photo of the executed permission slip. If the answer is No, the process ends at step 434. If the answer is Yes, then step 432 executes by submitting the photo and sending a notification to the school administrator or teacher.

System 100 in accordance with the disclosed embodiments may be an app that is downloadable to the parents' or guardians' computing devices 81-83. The parents or guardians would register into system 100 by creating a parental student account in order to access their students' profiles. The parents or guardians may also receive an invitation from the school to register with system 100.

Figure 5:
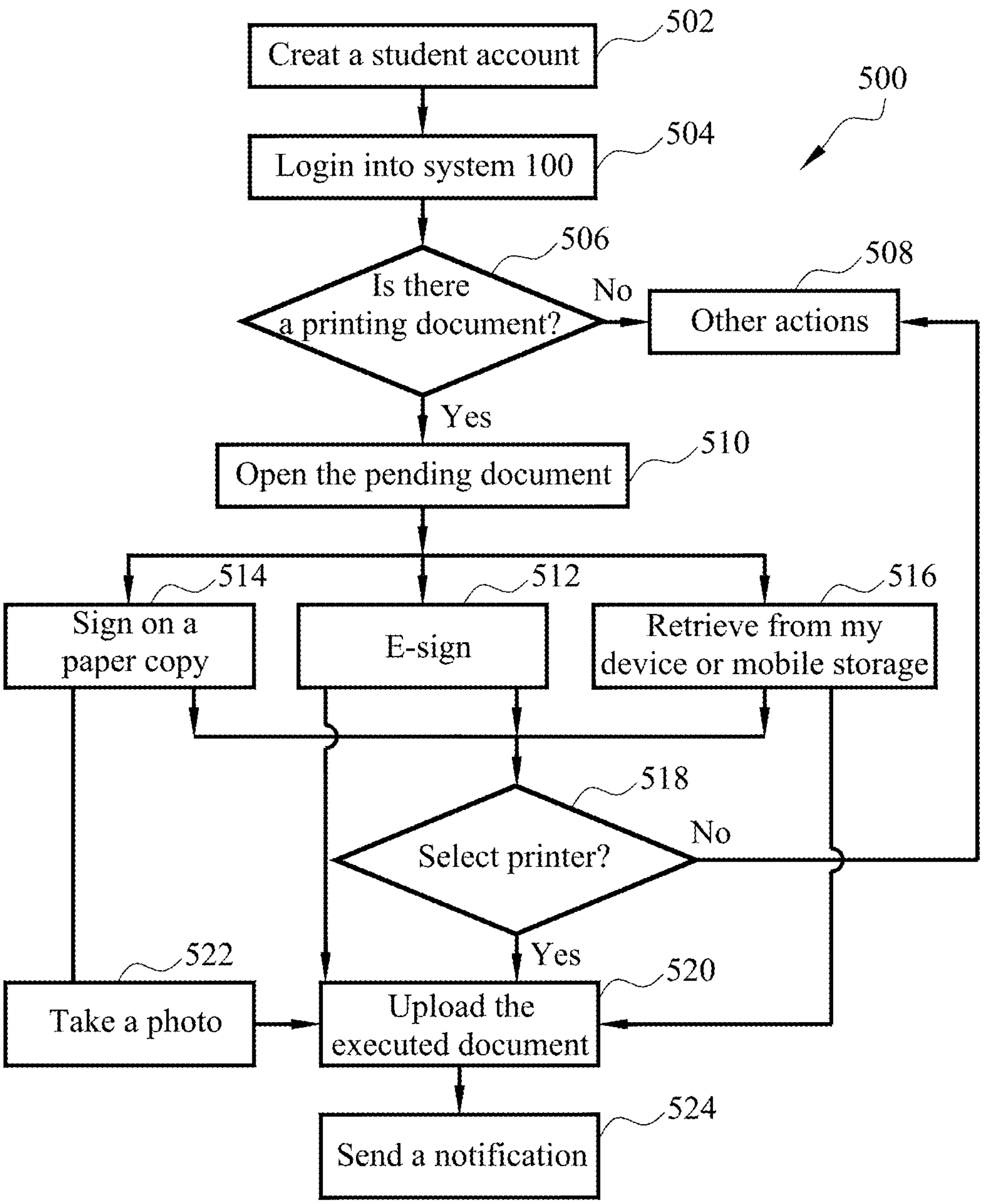
FIG. 5 is a flow chart showing how a parent's or guardian's computing device operates execution of an executable document in accordance with the disclosed embodiments.

FIG. 5 is a flow chart 500 illustrating how a parent's or guardian's computing device operates execution of an executable document, such as a permission slip. In accordance with the disclosed embodiments, the parents or guardians can access a school's website, download a mandatory compliance document managing app, or receive a link from the school to register into system 100.

Step 502 executes by creating a parental account. In this step, the parents or guardians creates a username and password, and also enter their children's information and school information their children attend. The parent or guardian may register more than one student in his parental account if he has more than one child attending the schools.

Step 504 executes by the parent or guardian logging in the managing system 100. After logging in, a home page of the managing system 100 may show icons like one or more student profiles, one or more student school profile (if his children attend different schools,) and a document file. The parent or guardian can click either on the icons to review and edit the information. For example, the parent or guardian may access the school profile to change the name of the school, access the student profiles to change the status of his child or children, and access the document file to review, delete, or execute documents stored in the document file. If there is a pending document in the document file that needs the parent or guardian's attention, an alert sign will be displayed next to the document file.

The student profiles are accessible by the school administrators or teachers with limits. As described above, the school administrators or teachers generate an executable document to be saved in the student profiles and send an alert notification or a link to the parents or guardians to alert that a pending document is waiting for theirs attention.

Step 506 executes by determining if there is a pending document saved in the document file. If there is a pending document, step 510 executes by opening the pending document. If there is no pending document, the parents or guardians proceed to other action or logout the system.

Executes 510 executes by opening the pending document. By doing so, the parents or guardians may click the document file. At this time, all forms and documents that have been reviewed or edited will be displayed on screens of the parents' or the guardians' computing devices. If there is a pending document to be signed, the parents or guardians open the pending document. In accordance with the disclosed embodiments, there are more than one way to execute and submit the pending document, as shown in steps 512, 514, and 516.

Step 512 executes by e-signing the pending document via an e-signing app, such as a Docusign App or other appropriate signing app.

If there is previously signed document, step 516 executes by retrieving the signed document from the parents' or guardians' drive or mobile storage.

Some parents or guardians prefer to sign the document on a hard copy. In this case, the parents or guardians may print out the pending document by their own and sing the document, as shown in step 514, and take a photo of the executed document, as shown in step 522.

After executing the pending document and before submitting the executed document, the parents or guardians may choose if they would like the executed document to be printed out at a printing device at the school site, as shown in step 518.

Step 520 executes by selecting a printing device and uploading the executed document. If the parents or guardians do not select a printing device, he can save the executed document to system 100. In any manner, when the executed document is uploaded and sent, a notification will be sent to the school administrator or teacher, at step 514.

System 100 is accessible by both parties of the school administrators or teachers and the parents or guardians. The school administrators or teachers create an account in the same way as the parents or guardians. After logging in system 100, the home page of a computing device used by the school administrators or teachers will show, but not limited to, files of "my class", "my students", "my documents", and "my printer." As described above, the administrators or teachers may generate an executable document from documents saved in "my document" file and save this executable document to desired student files. When the executed document submitted by a parent or guardian is received and notified, the school administrators or teachers may open the "my student" file, to retrieve saved executed document and send it to a printing device for printing. The school administrators or teachers may also open the "my printer" file to see if there is a print job queue in process and to check the status of print jobs saved in the print job queue. The print jobs include those sent from the parents' or guardians' computing devices and those sent from the school administrators' or teachers' computing devices.

Figure 6:
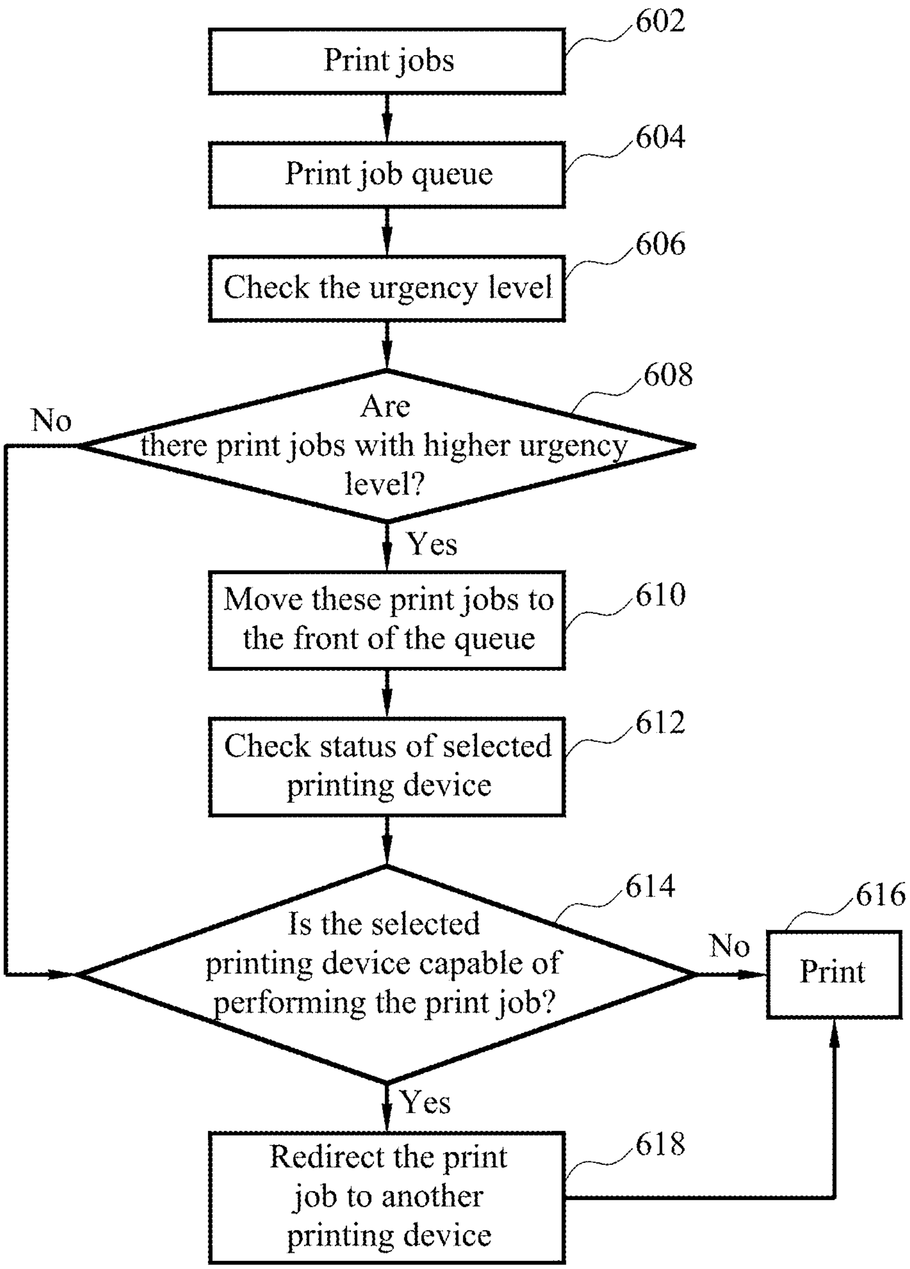
FIG. 6 is a flow chart of a method for managing print jobs in a print job queue in accordance with the disclosed embodiments.

FIG. 6 is a flow chart 600 of a method for managing print jobs in a print job queue by processor 30 of system 100 in accordance with the disclosed embodiments.

Step 602 executes by receiving print jobs from the parents' or guardians' computing devices and the school administrators' or teachers' computing devices.

Step 604 executes by saving the print jobs in a print job queue and step 606 executes by checking the urgency levels of the print jobs saved in the print job queue.

Steps 608 executes by determining whether there are print jobs with higher urgency levels than others. The urgency levels are determined by factors like the due dates and the importance levels of the print job for instance.

Step 610 executes by moving these print jobs with higher urgency levels to the front of the print job queue so that those urgent print jobs can be processed sooner.

Step 612 executes by checking statuses of the printing devices selected by the parents or guardians. Next, step 614 executes by determining if the selected printing devices are capable of performing the print job. For example, some of the selected printing devices may have too many printing jobs lined up for processing. Some of the selected printing devices may run out of papers or have paper jams. Some of the selected printing devices may be low in toner. In either case, step 616 executes by redirecting the print jobs to a different printing device that is capable of processing such print jobs.

After that, the print jobs are printed out in order in selected printing devices, as shown in step 618.

In accordance with the disclosed embodiment, the documents may be sorted by student, grade, class, vaccination, field trip, etc. These categories are customizable according to the policy of each school. System 100 may be integrated with a school administration system and the multi-function printing system of the school.

Further, the parents or guardians may download an application of system 100 in their computing devices. The parents or guardians may access their student's profiles to retrieve pending documents for execution and e-signs the documents with a built-in e-signing app, such as Docusign App or other applicable e-signing apps. The parents or guardians may also uploads, and remotely prints out the executed documents at printing devices of the school. The uploads can be done with Google Drive or similar cloud storage, via email, or with a mobile device camera.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A computer-implemented method for managing executions of mandatory compliance documents, comprising:

accessing a database storing a plurality of documents to retrieve a document;

assigning a policy to the document retrieved from the database, wherein the policy includes at least one of priority levels, deadlines, distributed printing devices, and recipients of the document;

sending the document from a first location, via a wireless network, to at least one remote computing device after the policy is assigned;

executing the document at the at least one remote computing device;

sending the executed document from the at least one remote computing device to the first location;

receiving the executed document from the at least one remote computing device; and post-processing the document received from at least one receiving computing device according to the policy assigned to the document.

2. The computer-implemented method of claim 1, wherein the post-processing includes directing the executed document received from the at least one remote computing device to a printing device for printing.

3. The computer-implemented method of claim 1, wherein the post-processing includes saving the executed document received from the at least one receiving computing device to a specific file in the database, wherein the specific file is associated with the at least one remote computing device.

4. The computer-implemented method of claim 1, further comprising selecting a printing device located within the first location by the at least one remote computing device, and sending the document, after executed by the at least one remote computing device directly to the selected printing device.

5. The computer-implemented method of claim 1, further comprising executing the document, at the at least one remote computing device, by signing the document electronically.

6. The computer-implemented method of claim 1, wherein the policy is stored in a policy file in the database which is editable before being assigned to the document.

7. The computer-implemented method of claim 1, wherein when the document is sent to and processed by multiple computing devices, the post-processing includes sending all documents received from the multiple computing devices to a print job queue in an order according to rules stored in the database, and directing the documents to at least one printing device for printing.

8. The computer-implemented method of claim 6, wherein the rules include the priority levels of the documents.

9. The method of claim 1, further comprising executing the document, at the at least one remote computing device, by signing the document electronically.

10. A computer-implemented method for managing executions of mandatory compliance documents, the computer-implemented method comprising:

at a local location, generating at least one document and assigning policies to the at least one document, wherein the policies include priority levels, deadline for executing the plurality of documents, designated printing devices, and categories of recipients of the at least one document;

storing the at least one document in at least one file in a database;

sending a link to at least one remote computing device, wherein the link allows the at least one remote computing device to access the at least one document stored in the at least one file, and wherein the at least one file is associated with the at least one remote computing device, respectively;

accessing and executing the at least one document by the at least one computing device; and acknowledging that the at least one document has been executed.

11. The computer-implemented method of claim 10, further comprising saving the executed document to one of the at least one file associated with the at least one remote computing device.

12. The computer-implemented method of claim 11, when the link is sent to and executed by multiple remote computing devices, all saved documents are sent to a print job queue in an order according to rules stored in the database, and directing the documents to printing devices selected at the local location.

13. The computer-implemented method of claim 10, further comprising selecting a printing device from the designating printing devices by the at least one remote computing device to print out the executed documents.

14. The computer-implemented method of claim 13, wherein the executed document is directly sent to the selected printing device from the at least one remote computing device.

15. The computer-implemented method of claim 14, when the link is sent to and executed by multiple remote computing devices, all executed documents are sent.

16. The computer-implemented method of claim 10, after acknowledging that the at least one document has been executed, the method further comprising receiving the executed documents at the local location, selecting a printing device from the designating printing device at the local location, and sending the executed document to the selected printing device for printing.

17. A system for managing executions of mandatory compliance documents, the system comprising:

a database storing a plurality of documents;

a managing device accessible to the plurality of documents stored in the database, comprising a processor, wherein the database further stores medium-readable instructions, which when executed, causes the processor to:

access the database to retrieve a document from the plurality of documents;

assign a policy to the document, wherein the policy includes at least one of priority levels, deadlines, distributed printing devices, and recipients of the document;

deliver the document to at least one receiving computing device after the policy is assigned, receive the document from the at least one receiving computing device after the document is processed by the receiving computing device; and post-process the document received from the at least one receiving computing device according to the policy assigned to the document.

18. The system of claim 17, wherein the post-processing includes directing the executed document received from the at least one remote computing device to a printing device for printing.

19. The system of claim 17, wherein the post-processing includes saving the executed document received from the at least one receiving computing device to a specific file in the database, wherein the specific file is associated with the at least one remote computing device.

20. The system of claim 17, wherein the at least one remote computing device selects a printing device located within the first location, and sends the document, after executed directly to the selected printing device.

* * * * *